United States Patent [19]

Gold et al.

[11] Patent Number: 4,806,740

[45] Date of Patent: Feb. 21, 1989

[54] MAGNETIC CHARACTERISTIC IDENTIFICATION SYSTEM

[75] Inventors: David G. Gold, Santa Monica; Frank D. Tucker, Valencia, both of Calif.

[73] Assignee: Light Signatures, Inc., Los Angeles, Calif.

[21] Appl. No.: 909,145

[22] Filed: Sep. 19, 1986

[51] Int. Cl.[4] .......... G06K 7/06

[52] U.S. Cl. .......... 235/449; 235/493; 283/82; 283/74

[58] Field of Search .......... 235/440, 449, 493; 283/82, 83, 74, 77, 79

[56] References Cited

U.S. PATENT DOCUMENTS

| | | | |
|---|---|---|---|
| 3,275,806 | 9/1966 | Quin et al. | 235/440 |
| 3,636,318 | 1/1972 | Lindstrom et al. | 235/488 |
| 3,662,156 | 5/1972 | Grosbard | 235/488 |
| 3,760,357 | 9/1973 | Inose et al. | 382/46 |
| 3,790,754 | 2/1974 | Black et al. | 235/380 |
| 3,859,508 | 1/1975 | Brosow et al. | 235/380 |
| 4,013,894 | 3/1977 | Foote et al. | 235/440 |
| 4,025,759 | 5/1977 | Scheffel | 235/380 |
| 4,038,596 | 7/1976 | Lee | 235/449 |
| 4,114,032 | 9/1978 | Brosow et al. | 235/493 |
| 4,218,674 | 8/1980 | Brosow et al. | 235/493 |
| 4,432,567 | 2/1984 | Stockburger et al. | 283/83 |
| 4,620,727 | 11/1986 | Stockburger et al. | 283/82 |
| 4,630,845 | 12/1986 | Sanner | 283/91 |

*Primary Examiner*—A. D. Pellinen
*Assistant Examiner*—Jeffrey A. Gaffin
*Attorney, Agent, or Firm*—Nilsson, Robbins, Dalgarn, Berliner, Carson & Wurst

[57] ABSTRACT

A system for authenticating an object on the basis of a repeatably sensible, random magnetic medium or substance deposited on an object, for example in the form of a document. A magnetic medium printed on the document is sensed for its random characteristic which is reduced to a data format that is recorded on the object, e.g. document. Specifically, the repeatably sensible, random characteristic of the magnetic medium is recorded in a digital format on a magnetic stripe of a document so as to identify or verify the document. Conditioning techniques, as depositing and recording the magnetic characteristic medium and selectively sensing it, accomplish various specific objectives.

17 Claims, 3 Drawing Sheets

MAGNETIC CHARACTERISTIC IDENTIFICATION SYSTEM

BACKGROUND AND SUMMARY OF THE INVENTION

For a period of several years, continuing efforts have been maintained to safeguard valuable documents and other objects against counterfeits and misuse. One such effort has involved producing specific forms of objects that are exceedingly difficult or impractical to duplicate. As a related cosideration, such objects must be recognizable for their identifiable characteristic. In that regard, it has been proposed to sense the identifying characteristic of an object, reduce the characteristic to a manageable data format and record such data on the object as a so-called "escort memory". For example, U.S. Pat. No. 4,423,415 (Goldman) discloses utilizing the inherent random characteristic of bond paper to identify individual documents. In another arrangement, U.S. Pat. No. 4,114,032 (Brosow et al.) discloses embedding magnetizable particles, e.g. fibers, in documents to accomplish an identifiable characteristic. Various other schemes for characterizing objects including documents have been proposed. However, a continuing need exists for alternative and improved forms of such systems to accommodate the needs of economy and expediency.

Magnetic materials have been developed as effective mediums to record data. Magnetics are generally inexpensive and relatively immune from dirt and small scratches. In general, the present invention is based on recognizing certain random characteristics of magnetic medium and utilizing such characteristics as a basis for identification. For example, magnetic medium may be printed or otherwise disposed on a base or substrate sheet of paper or paper-like medium, to impart random magnetic characteristics that may be repeatably sensed to identify an object. An effective form of document identification is disclosed herein utilizing a repeatably sensible, random characteristic of a magnetic substrate deposited on a document. The document also carries data indicative of the characteristic that may be used for verification by comparison.

In accordance with one technique of the present invention, a base member, e.g. paper, provides a support substrate surface on which a layer of magnetic substance is disposed to possess a repeatably sensible, random characteristic. The magnetic substance may vary as a result of: nonuniformity of the paper surface, nonuniformities in printing or other deposition process, or variations in the dispersion of magnetic particles. Thus, density variations are randomly created that uniquely characterize an individual document and furthermore are fixed and repeatable. The random characteristic is sensed and may be recorded on the document as with a magnetic stripe as well known in the prior art. Of course, other machine-readable indicia as optical codes may also be utilized. In any event, such a document may be verified or authenticated by freshly sensing the random magnetic characteristic, reducing it to a data format as before, and comparing the result with the recorded data format. In accordance herewith, various production and verification systems are disclosed and in that regard specific sensing techniques are set out.

As disclosed in detail below, the system hereof may be variously implemented using different forms of magnetic medium, different support substances and different production and utilization techniques. For example, the random magnetic characteristic may be accomplished by printing a document with varying magnetic materials. Also, various techniques may be employed to precondition and sense the magnetic layer for comparison.

BRIEF DESCRIPTION OF THE DRAWINGS

In the drawings, which constitute a part of this specification, exemplary embodiments of the invention are set forth as follows.

DESCRIPTION OF THE ILLUSTRATIVE EMBODIMENTS

As indicated above, detailed illustrative embodiments of the present invention are disclosed herein. However, physical identification media, magnetic substances, data formats and operating systems structured in accordance with the present invention may be embodied in a wide variety of forms, some of which may be quite different from those of the disclosed embodiments. Consequently, the specific structural and functional details disclosed herein are merely representative; yet in that regard they are deemed to afford the best embodiments for purposes of disclosure and to afford a basis for the claims herein which define the scope of the present invention.

Figure 1:
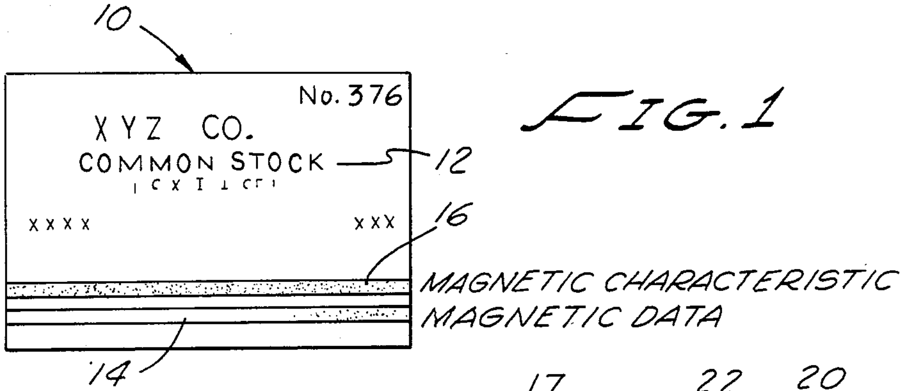
FIG. 1 is a plan view of a document according to the present invention illustrated as a stock certificate.

Referring initially to FIG. 1, a document 10, symbolized as a stock certificate, is illustrated embodying the present invention. Specifically, in addition to considerable printed indicia 12, the document 10 carries a conventional magnetic recording stripe 14 and a magnetic characteristic layer 16 also in the configuration of a narrow strip.

The layer 16 has a magnetic characteristic as described in detail below, which can be sensed and reduced to a convenient data format to identify the document 10. Specifically, as illustrated in FIG. 1, the magnetic characteristic of the layer 16 is sensed and reduced to a digital format which is recorded on the magnetic stripe 14. Accordingly, the document 10 can be effectively authenticated by freshly sensing the magnetic characteristic of the layer 16, processing the sensed signal according to a predetermined format, and comparing the result with data from the magnetic stripe 14. Of course, a variety of correlation and signal processing techniques may be employed along with a variety of sensing techniques; however in any event, a favorable comparison verifies the authenticity of the document 10.

Some consideration of the relationship between the magnetic stripe 14 and the layer 16 is appropriate with respect to understanding the disclosed system embodying the present invention. The magnetic data stripe 14 involves techniques of the magnetic recording industry wherein the media of the magnetic stripe is an integral part of a magnetic read-write system. Accordingly, the media of the magnetic stripe 14 is tightly specified and highly controlled in accordance with well known standards of the art. Conversely, the media of the layer 16 varies significantly and in fact it is such variation that affords the characteristic for identifying the document 10. The density along the magnetic layer 16 varies for three primary reasons, i.e. the nonuniformity of the paper in the document 10, the process of depositing the layer 16 on the document 10 and the dispersion of magnetic particles in the layer 10. The density variations are randomly created to afford a unique document and are fixed and repeatable to identify the document. In that regard, as used herein, density and remanent magnetization are equivalents. Of course, in some cases, the remanent magnetization may vary in a fixed, repeatable pattern for a given magnetic layer while the density remains relatively constant. Such a fixed, repeatable pattern is a form of the characteristic as described and utilized by the present invention for object identification.

At this point it may be helpful to discuss methods of creating random magnetic characteristic manifestations or "noise" attendant sensing the layer 16. Forms of "noise" can be defined as follows. First, DC noise results when a magnetic media has been magnetized by a DC field. Modulation noise is defined as variations in the reproduced amplitude which occur when an AC signal of constant amplitude is recorded. Bias noise occurs when an AC bias is applied to a recording head with substantially no signal current, e.g. no signal riding on the AC bias. Bulk-erased noise results when a media has been demagnetized by a cyclic field. Note that bulk-erased noise occurs because a media is composed of numerous magnetic domains which always remain magnetized. That is, only the polarity changes. Demagnetization on a large scale causes substantially equal numbers of particles to be magnetized in opposing directions with a net difference of substantially zero. Accordingly, in a perfectly dispersed media (magnetic particles equal) that is magnetized longitudinally in a perfectly uniform manner, flux emanates only at the ends. As a result, the noise would be the same as if the media was in a state of zero net magnetic flux. Any change will cause flux, that is, variance from the state of zero net magnetic flux is caused by nonuniformity.

Essentially, nonuniformity of magnetization can be attributed to three major causes, specifically: (1) variation in the amount of magnetic material per unit of volume along the media (produced by the printing process or nonuniformities in the substrate surface as paper); (2) variations in the magnetic material; and (3) fluctuations in the applied recording current.

Figure 2:
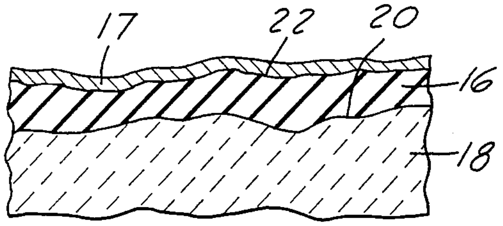
FIG. 2 is an enlarged fragmentary sectional view take through a portion of the document along a magnetic characteristic of FIG. 1.

Each of the sources of nonuniformity will be considered independently as related to the present development. However, preliminarily reference will be made to the enlarged sectional view of FIG. 2 illustrating nonlinearities of the magnetic layer 16. Specifically, the layer 16 is deposited on a sheet 18 providing a support substrate. The sheet 18 may comprise a multitude of different papers or paper-like materials as a product comprising a collection of plastic fibers known as "Premoid".

The sheet 18 has a surface 20 indicated as an irregular boundary which receives and supports the magnetic layer 16 and a protective coating 17. The irregularity of the surface 20 along with irregularities in the surface 22 of the layer 16 are illustrated in FIG. 2 and constitute a source of nonuniformity, i.e. variation in the amount of magnetic material per unit of volume along the media. The nonuniformity affords a characteristic that is enhanced by the layer 17 of lacquer, enamel or other nonmagnetic coating that may vary the spacing of a sensor head from the layer 16.

Figure 3:
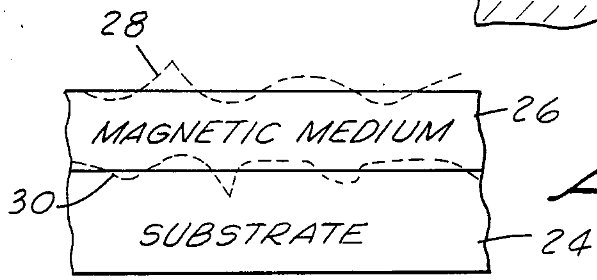
FIG. 3 is a view similar to FIG. 2 illustrating a magnetic characteristic of a medium.

The nonlinearity is illustrated graphically in FIG. 3. Specifically, an idealized section of the support substrate 24 is illustrated carrying a similarly represented section 26 of magnetic media. That is, for purposes of explanation, and rather than to illustrate the irregularities and voids of substrate as paper, in FIG. 3, solid lines are shown to depict perfect or uniform dispersion of magnetic material 26 on a perfect or uniform support substrate 24.

In FIG. 3, the dashed lines 28 and 30 illustrate variations from the idealized structure which result from printing process variations (asperity) and substrate variations (nonuniformity). That is, the asperity or roughness indicated by the dashed line 28 is attributed to the printing process for depositing the section 26. Variations in the substrate illustrated by the dashed line 30 are caused by variations at the surface of the substrate 24, e.g. the paper.

The variations illustrated in FIG. 3 provide the basis for individual characteristics which enable identifying objects in accordance herewith. That is, variations in the magnetic material thickness as illustrated in FIGS. 2 and 3 afford a characteristic that can be repeatedly measured for identifying an object.

Referring to FIG. 3, it is to be noted that the irregularities illustrated by the line 28 (asperity) may change as the surface defined by the line 28 is abraded as with use of the document. However, the variations represented by the line 30 are less susceptible to change. These considerations are significant in implementing systems for individual documents and applications where the documents may or may not be subject to wear, as described in detail below.

As indicated above, magnetic character also may result from varying the magnetic material in the layer 16 (FIG. 1). Specifically, character may be obtained by using an ink mixture to print the layer 16 which carries magnetic particles of varying size, or like magnetic particles that are variably dispersed. Such a technique may be employed to provide the magnetic character or to enhance the character of a magnetic layer. Similar structures can be accomplished by heat transfer, slurrying or gluing.

As indicated above, character may be sensed as a result of variations in the recording current. Generally, such variations are accounted for in implementations of the present invention by subjecting the magnetic layer to a standardized treatment, e.g. erasing and recording to a standard.

In view of the above considerations, techniques for producing the document 10 may now be considered in a more meaningful context. Surface nonuniformity is a well known characteristic of various paper forms. Accordingly, the character of the document 10 can be enhanced by selecting a paper or other substrate possessing a particularly nonuniform or irregular surface. Somewhat similarly, various forms of ink and printing techniques are known to deposit coatings or layers which are smooth to varying degrees. Accordingly, enhanced asperity can be attained.

Figure 4:
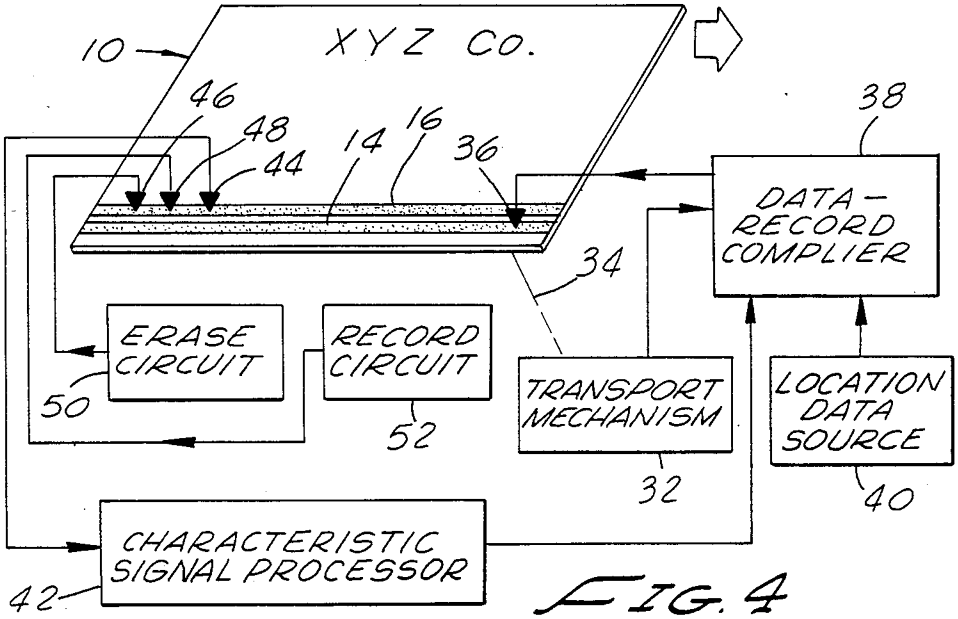
FIG. 4 is a block diagram of a document production system in accordance with the present invention.

With the considerations of paper and printing in view, a substrate is selected, cut to the desired document size and printed with the layer 16 as illustrated in FIG. 1. As a part of the operation, the printed indicia 12 may also be deposited. To complete the physical form of the document 10, the magnetic stripe 14 may be adhesively affixed. Such a "raw" document form is then processed to accomplish the document 10 in accordance herewith. Such processing involves apparatus as represented in FIG. 4 and will now be considered in detail.

A raw form of the document 10 is received by a transport mechanism 32 (FIG. 4, right central) the physical relationship being symbolically represented by a dashed line 34. A wide variety of transport mechanisms for dynamic magnetic recording are well known in the prior art and may be implemented for use as the mechanism 32 for processing the document 10. Essentially, such mechanisms detect the presence of a document then move the document or other sheet form to facilitate dynamic sensing and recording. As represented in FIG. 4, the mechanism 32 moves the document 10 to the right as represented by an arrow (upper right).

In association with the transport mechanism 32, several magnetic heads are mounted in transducing relationship with the magnetic data stripe 14 and the magnetic characteristic layer 16. Specifically, a magnetic record head 36 (right) is supported in transducing relationship with the magstripe 14. The head 36 receives recording signals from a data compiler 38 which is connected to receive signals from a data source 40 and a signal processor 42.

The signal processor 42 receives signals from a sense head 44 disposed at the left as illustrated, in transducing relationship with the layer 16. Essentially, the head 44 senses the characteristic of the layer 16 in the form of an electrical signal which is applied to a processor 42 to provide a digital format that is combined with other digital data from the source 40 by the compiler 38 and recorded on the magstripe 14.

In considering the relationship between the heads 36 and 44, as indicated above, the transport mechanism 32 transports the document 10 from left to right as depicted. Consequently, the head 44 substantially completes a scansion of the document 10 before the head 36 begins to scan the document 10. Thus, the head 44 reads the characteristic from the layer 16 and thereafter the head 36 records signals representative of the characteristic in the stripe 14. Preceding the head 44 are conditioning heads, specifically an erase head 46 and a record head 48. The erase head 46 is driven by an erase circuit 50 and the record head 48 is driven by a record circuit 52.

Considering the operation of the system of FIG. 4 to complete the document 10 from a raw form, assume the placement of such a form in the transport mechanism 32 for transducing action in cooperative relationship with the magnetic heads 36, 44, 46 and 48. As the raw form of the document 10 is initially propelled under the head 46 (moving from left to right) the layer 16 is erased or cleared of spurious magnetic content. The layer 16 next passes under the head 48 which is driven by a circuit 52 to accomplish a standard recording on the layer 16. For example as explained above, the head might be driven with a linear DC signal to accomplish DC noise, by a linear AC signal to accomplish modulation noise or by a linear bias signal to accomplish bias noise. A nonlinear recording also might be employed. In any event, a standard record is thus accomplished.

As the document continues to move, the layer 16 next encounters the head 44 which senses the magnetic characteristic of the preconditioned layer 16. Consequently, an analog signal manifesting the characteristic is supplied from the head 44 to the characteristic signal processor 42. A portion or portions of the analog signal may be selected to manifest select areas of the layer 16 as by well known sampling techniques and apparatus in the processor 42 to provide specific values for reduction to digital representations. Note that techniques for selecting and processing area representative analog signals are disclosed in the above-referenced to Goldman, U.S. Pat. No. 4,423,415.

The processor 42 also incorporates an analog-digital converter as well known in the art for converting the selected analog samples. Accordingly, a format of select digital signals representative of the magnetic characteristic are supplied from the processor 42 to the compiler 38.

As suggested above, the compiler 38 also receives other data which may be representative of information concerning the document 10 and the techniques employed for sensing the characteristic of the layer 16. In the disclosed embodiment, the data specifies the location of the characteristic features of concern. Such data is instrumental in selectively sampling the analog signal representative of the characteristic to obtain the specified signals to be digitized.

The compiler 38 assembles the digital data and accordingly drives the record head 36 to accomplish the desired record in the magnetic stripe 14. With the completion of such recording, the document 10 is complete and may be subsequently processed for verification as genuine.

Figure 5:
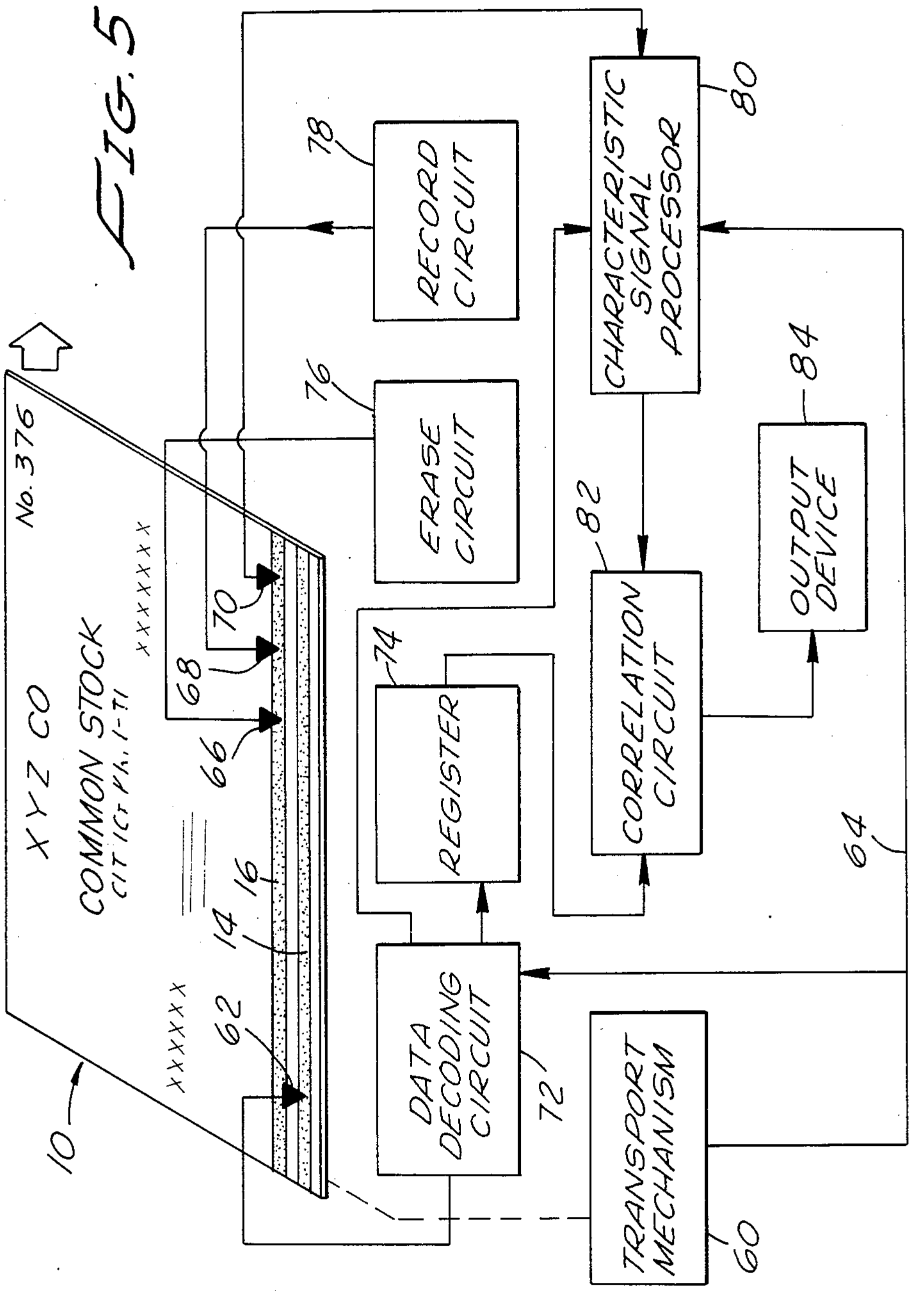
FIG. 5 is a block diagram of a document verification system in accordance with the present invention.

Documents produced in accordance herewith may be subject to a wide variety of different applications and uses. In the exemplary form of a stock certificate, the document 10 may be released to the owner and with reasonable safety may be placed in the hands of a bailee, for example as a pledge. Usually, after periods of random custody, it is important to verify such a document as genuine. The system of the present invention contemplates such verification and confirmation of the document 10 as genuine. A system of verification is illustrated in FIG. 5 and will now be considered in detail. The system of FIG. 5 receives the document 10 in a transport mechanism 60 somewhat as the mechanism described above with reference to FIG. 4. However, the mechanism 60 is physically associated with a set of transducer heads in an arrangement distinctly different from that described above with respect to FIG. 4. Specifically, as the transport mechanism 60 propels the document 10 from left to right (as indicated), initial transducing relationship is established between the magnetic stripe 14 and a sensing head 62. Note that in accordance with the prior art, the transport mechanism 60 senses the presence of the document 10 and supplies a signal. In the system of FIG. 5 that signal is manifest in a line 64.

As the document 10 moves to substantially complete the scansion of the stripe 14 by the head 62 (as illustrated), the layer 16 encounters a sequence of heads 66, 68 and 70. Accordingly, the magnetic stripe 14 is sensed by the head 62 well ahead of the heads 66, 68 and 70 sensing the layer 16.

In sensing the magnetic stripe 14, the head 62 supplies digital data to a decoding circuit 72 which is in turn connected to a register 74. Accordingly, the magstripe 14 is sensed, the contents is decoded and set in the register 74. Specifically, the decoded data specifies the characteristic data of interest, the location of that data and any desired ancillary information, all in a digital format.

As the register 74 is being loaded, scanning of the layer 16 begins. The head 66 is connected to an erase circuit 76 while the record head 68 is connected to a record circuit 68. Accordingly, the heads 66 and 68 precondition the layer 16. The preconditioned layer 16 is then sensed by the sense head 70, connected to a characteristic signal processor 80. Note that the function of the heads 66, 68 and 70 is similar to that of the heads 44, 46 and 48 as described with respect to FIG. 4. That is, the head 66 clears the layer 16, the head 68 imposes a predetermined recording pattern and the head 70 senses the layer to provide the characteristic signal as described in detail above. The resulting characteristic signal is supplied to a processor 80.

The data decoding circuit 72 (upper left) supplies information to the processor 80 to specify the selection or sampling of values in the characteristic signal. That is, the characteristic signal processor 80 samples the same predetermined portions of the received signal to derive sets of digital values for comparison and may be as described in the above-referenced U.S. Pat. No. 4,423,415.

The sampled values are digitized then supplied from the processor 80 to a correlation circuit 82 which is also coupled to the register 74. Functionally, if appropriate, the correlation circuit 82 actuates an output device 84 to manifest predetermined degrees of similarity between the freshly observed characteristic data and the previously recorded characteristic data from the same locations. The correlation circuit 82 may take various well known forms. Peak values exceeding a threshold can be tested, various sampled values can be used or correlation algorithms may be implemented. Various forms of signal devices might be employed in the output device 84 as well known in the prior art.

To consider a verification operation by the system as illustrated in FIG. 5, assume the placement of the document 10 in cooperative relationship with the transport mechanism 60. Accordingly, the transport mechanism 60 senses the presence of the document 10 and provides a signal through the line 64 to initiate the operation of the processor 80 and the circuit 72 to perform transducing operations. As suggested above, the signal indicating the presence of a document may be provided by an optical sensor in accordance with well known and widely used techniques of magnetic stripe card readers.

The initial transducing relationship occurs when the magstripe 14 of the document 10 encounters the head 62. As a consequence, digital values representative of the document characteristic (layer 16) are sensed from the stripe 14 along with certain information to indicate the specific location of values for comparison within the layer 16. Other data may also be provided. The data relating to identification of the characteristic is supplied to the processor 80 while signals representative of the actual select characteristic are set in the register 74.

When the head 62 has substantially completed its scan of the stripe 14, the layer 16 encounters the heads 66, 68 and 70 in that sequence. The head 66 clears the layer of any spurious signals after which the head 68 records the layer with a predetermined test signal. Thereafter, with the layer preconditioned, the head 70 senses the recorded signal (along with other noise) for processing by the processor 80 to develop the select characteristic values in a digital format.

The select characteristic values are supplied to the correlation circuit 82 which also receives previously sensed similar-format values from the register 74. Accordingly, the correlation circuit 82 determines the degree of correlation and in accordance with predetermined standards actuates the output device 84 accordingly. Thus, depending on the degree of correlation or similarity between the fresh characteristic values and the previously recorded characteristic values, the document 10 is authenticated as genuine.

As indicated above, the use of a magnetic layer to provide an identifying characteristic affords different possibilities which account for random characteristics in a magnetic medium. As explained, the characteristic might result from variations in the gross amount of magnetic material, variations in the individual quantity of magnetic material or variations in the recording signal. Any of such variations might be sensed, refined and converted to a digital format using signal processing circuits as well known in the prior art. As an additional consideration, signal selectivity may be exercised in the interests of the nature of the document 10 or its intended use.

As indicated above, the character resulting from variations in the gross amount of magnetic material per unit of volume along the layer 16 are attributed both to the printing process and nonuniformities of the substrate surface, see FIGS. 2 and 3. As explained with respect to FIG. 3, the character relating to irregularities indicated by the dashed line 28 (asperity) may change somewhat with use of the document 10 in which the surface of the layer 16 is abraded. In the event that anticipated wear is negligent, a magnetic characteristic may be sensed by providing a recording current in the magnetic record head to a level so that the effective recording field is nearly uniform throughout the magnetic material depth. For example, referring to FIG. 6, the idealized substrate section 24 and the magnetic section 26 (similarly idealized) are illustrated in relation to a magnetic recording head 88. Note that a dashed line 90 indicates an effective recording field that approaches uniformity through the depth of the section 26.

A sensing of the section 26 that has reached maximum remanent magnitization yields a waveform that is directly related to the amount of magnetic material along the substrate which is fixed and repeatable relative to specific locations along the magnetic layer. Such a waveform represents a raw form of an observed characteristic. However, in some instances wear of the magnetic layer 16 (FIG. 1) will not be expected to be negligible and as a result, compensation may be provided. For such an application, a select magnetic characteristic is obtained by deriving the waveform described above along with another waveform that indicates the asperity variations as illustrated with respect to a head 92. Note that the dashed line 94 involves a magnetic field which is limited to a space near the surface of the section 26.

While the head 92 senses the surface (asperity), the head 88 senses the total substrate section 26. Accordingly, the heads sense at different depths and a characteristic that is somewhat immune from surface wear in the magnetic layer may involve the subtractive combination of a deep field minus a shallow field. As a result, the asperity signal is eliminated from the total sensed signal. Essentially, the asperity waveform is the component which is susceptible to modification with wear of the document.

Note that the asperity waveform may be derived by passing a DC current through the recording head adjusted to produce minimum noise. The effective field penetrates to a level above the substrate nonuniformities. For example, a remanent magnitization of fifty percent of the maximum remanent magnitization accomplishes such an operation. A read-back of the magnetic stripe then generates the asperity waveform.

Figure 6:
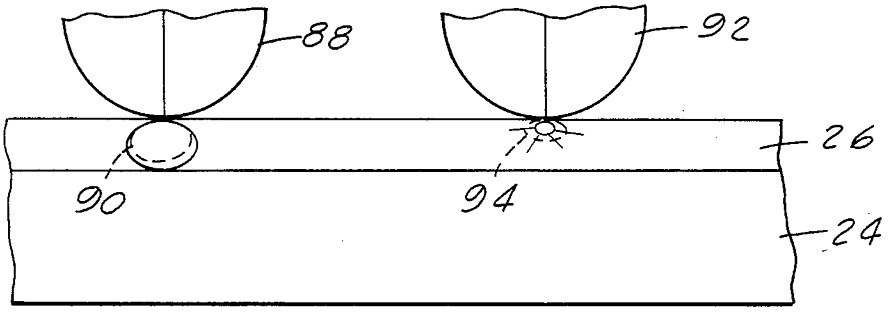
FIG. 6 is a schematic diagram illustrating sensory operations for use in the systems of FIGS. 4 and 5.
Figure 7:
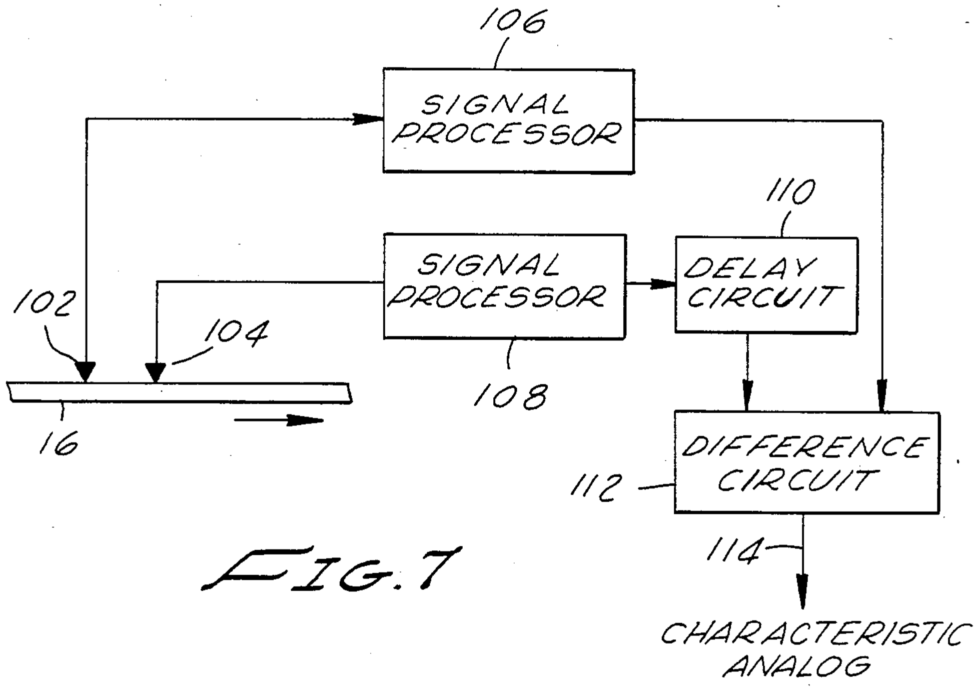
FIG. 7 is a diagram illustrating a sensor arrangement to accomplish the operations illustrated in FIG. 1.

To illustrate the selective-depth sensing operation, a magnetic layer 16 is illustrated in FIG. 7 which is being sensed by heads 102 and 104 similar to the heads 88 and 92 of FIG. 6. The characteristic signals from the heads 102 and 104 are processed respectively by the processors 106 and 108. The signal from the processor 108 is delayed by a delay circuit 110 to be in space-time coincidence with the signal from the processor 106. The delayed signal from the circuit 110, and with the signal from the processor 106 are applied to a difference circuit 112 which essentially subtracts the asperity waveform from the total characteristic waveform. As a result, a characteristic analog signal is provided at an output 114 which is somewhat immune to changes in the surface of the magnetic layer 16. The structure of FIG. 7 may replace either of the single heads 46 or 70 to provide a select characteristic somewhat immune to surface variations of the chracteristic magnetic layer.

As will be readily appreciated from the above illustrative embodiments, the system hereof is susceptible to a great number of modifications and deviations within the basic conceptual framework as described. Accordingly, the scope hereof is deemed to be set forth in the claims below.

What is claimed is:

1. An authenticator device of verifiable authenticity comprising:

a base member having a support substrate defining a surface;

a layer of magnetic substance disposed on said support substrate surface in at least one area to possess a repeatably magnetically-sensible, random, variable density characteristic to identify said authenticator device; and a machine-readable record on said base member positioned at a location displaced from said area of said layer of magnetic substance and representative of said repeatably magnetically-sensible, random, variable density characteristic to verify authenticity of said device by comparison with said repeatably magnetically-sensible, random variable density characteristic.

2. A device according to claim 1 wherein said base member comprises a sheet of paper-like material.

3. A device according to claim 1 wherein said layer comprises a strip of magnetic material on said substrate with an irregular boundary at said surface of said support substrate.

4. A device according to claim 1 wherein said machine-readable record comprises a magnetic stripe.

5. An authenticator device according to claim 1 wherein said layer of magnetic substance comprises an ink mixture providing a variable magnetic character.

6. An authenticator device according to claim 5 wherein said support substrate of said base member comprises a paper-like sheet and said ink mixture is disposed on said substrate with an irregular boundary therebetween.

7. A process for the production of a device for verification of authenticity, comprising the steps of:

selecting an object defining a surface;

depositing a layer of magnetic substance on at least one area of said surface whereby said deposit on said surface has magnetic irregularities affording a repeatable, random magnetic characteristic to thereby characterize the device;

sensing said magnetic characteristic to provide representations thereof; and recording representations of said magnetic characteristic for subsequent verification of said object as authentic.

8. A process according to claim 7 wherein said layer is deposited by printing.

9. A process according to claim 7 wherein said magnetic irregularities are accomplished by dispersing, randomly orienting or incorporating substance of varying remanence in said layer.

10. A process according to claim 7 wherein said step of sensing said magnetic characteristic includes sensing different dimensions of said layer of magnetic substance with a plurality of magnetic heads to provide a plurality of sensed signals.

11. A process according to claim 10 wherein said step of sensing said magnetic characteristic further includes processing and combining said plurality of sensed signals.

12. A process according to claim 7 further including a step of recording said layer with a standard record prior to sensing said magnetic characteristic to provide representations thereof.

13. A system for the identification of objects having a layer of magnetic substance thereon, which layer has random magnetic irregularities, said object further having a machine-readable record thereon registering indications of said machine-readable irregularities, said system comprising:

first means for sensing said layer of magnetic substance including a pair of magnetic sensing heads for providing different representative signals of said layer of magnetic substance;

means for combining said representative signals to provide a characteristic signal;

second means for sensing said machine-readable record to provide a record signal; and means for comparing said characteristic signal and said record signal to provide an indication of the verification of said object.

14. A system according to claim 13 wherein said first means for sensing said layer of magnetic substance includes means for magnetically preconditioning said magnetic layer of magnetic substance.

15. A system according to claim 14 wherein said preconditioning means comprises means for magnetically recording said layer of magnetic substance.

16. A system according to claim 13 wherein said second means for sensing said layer of magnetic substance comprises a structure for moving said object relative to said magnetic sensing heads.

17. A process for verifying authenticity comprising the steps of:

selecting an object defining a surface;

depositing a layer of magnetic substance on at least one area of said surface whereby said deposit on said surface has magnetic irregularities offering a repeatable, random magnetic characteristic to thereby characterize the device;

sensing said magnetic characteristic to provide representations thereof;

recording representations of said magnetic characteristic for subsequent verification of said object as authentic; and freshly sensing said magnetic characteristic to provide fresh representations thereof and comparing said fresh representations with said recorded representations to provide an indication of verification.

* * * * *